United States Patent [19]
Williams

[11] Patent Number: 5,949,154
[45] Date of Patent: *Sep. 7, 1999

[54] AUXILIARY POWER SUPPLY CONTROL

[75] Inventor: Kevin Michael Williams, Indianapolis, Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/749,750

[22] Filed: Nov. 15, 1996

[51] Int. Cl.⁶ .................................................. H02J 9/06
[52] U.S. Cl. ........................ 307/64; 348/730; 348/734
[58] Field of Search ............................... 307/64; 364/707; 348/730, 734; 363/97; 361/100

[56] References Cited

U.S. PATENT DOCUMENTS

| | | | |
|---|---|---|---|
| 4,595,977 | 6/1986 | Von Der Ohe | 361/100 |
| 4,788,591 | 11/1988 | Decraemer | 348/730 |
| 4,937,727 | 6/1990 | Leonardi | 363/97 |
| 5,017,844 | 5/1991 | Lendaro | 315/408 |
| 5,270,823 | 12/1993 | Heidebroek et al. | 348/730 |
| 5,621,632 | 4/1997 | Hoh et al. | 363/97 |

FOREIGN PATENT DOCUMENTS

| | | | |
|---|---|---|---|
| 3607018 A1 | 10/1987 | Germany | H02M 3/335 |
| 7-308065 | 11/1995 | Japan | H02M 3/28 |

*Primary Examiner*—Albert W. Paladini
*Attorney, Agent, or Firm*—Joseph S. Tripoli; Joseph J. Laks; Marion P. Metelski

[57] ABSTRACT

A control circuit is provided for an auxiliary power supply in an apparatus having run and standby modes of operation. The auxiliary power supply is energized by raw $B^+$ voltage and operates in a switched mode, responsive to a feedback signal indicative of loading. A switching circuit, also energized by the raw $B^+$ voltage, changes the auxiliary power supply between operational and non operational modes responsive to an on/off signal. The on/off signal is indicative of the run and standby modes of operation of the apparatus, for example a run supply voltage generated by another power supply in the apparatus. The switching circuit includes a switch optically coupled to a voltage threshold detector. The switch interrupts the feedback signal, for example by shunting to ground, in a manner which inhibits operation of the switching controller during the standby mode of operation of the apparatus.

22 Claims, 5 Drawing Sheets

AUXILIARY POWER SUPPLY CONTROL

BACKGROUND OF THE INVENTION

1. Field of the Invention

The invention relates to the field of switched mode power supplies for apparatus having a run mode and a standby mode of operation, such as a television receiver. In particular, the invention relates to the field of controlling auxiliary power supplies in such apparatus when changing between the run and standby modes of operation.

2. Description of Related Art

In a typical run/standby power supply, for example as used in television receivers, a bridge rectifier and a filter capacitor provide a raw DC voltage (called the $B^+$ voltage, or raw $B^+$), whenever the power supply is coupled to the domestic mains. Standby mode loads can be powered directly from the $B^+$ voltage or from another voltage that is always present. Many run mode loads, however, are powered through a voltage regulating supply such as a switched mode supply, that operates only in the run mode. The run mode power supply for certain loads, such as the deflection circuits and high voltage screen loads, typically employ the flyback transformer that powers beam deflection. A separate or auxiliary power supply also can be operated as a switched mode supply and may provide a regulated $B^+$ voltage for the flyback transformer as well as other auxiliary supply voltages.

Projection televisions, for example, have particularly demanding power needs because they have three high power cathode ray tubes (CRTs). An auxiliary power supply is useful to power the convergence amplifiers for the tubes, two such amplifiers generally being required for each CRT. These amplifiers require positive and negative polarity voltages and can dissipate substantial power.

In a switched mode supply, an input DC voltage (such as the $B^+$ voltage in a television) is coupled to one terminal of a primary winding of a transformer and the other terminal of the primary winding is coupled to a switching device, such that current is coupled to the transformer when the switching device conducts. The switching device is alternately turned on and off during the run mode of operation, providing alternating currents in secondary windings of the transformer, which are rectified and filtered to provide run mode supply voltages.

Regulation of the output voltages is achieved by feedback control provided by, for example, a feedback winding of the transformer. The respective secondary windings are closely coupled, so that load variations on any of the secondary windings are reflected on the feedback winding. The feedback control compares a voltage on the feedback winding with a standard or threshold voltage level, which may be provided by the switching device, and modulates the frequency and/or pulse width at which the switching circuit is turned on and off. The switching device is compensated to render it insensitive to variation of the raw $B^+$ input voltage, while maintaining accurate output voltage levels as current loading varies over a nominal range of power consumption.

The switching device for a power supply as described can be integrated circuit (IC) power supply controller from the Sanyo STK730 series. This controller includes a FET power switching transistor, an error amplifier and driver, and an over-current protection circuit in a single package. When coupled into a switched mode supply and first turned on, current from the $B^+$ voltage flows to ground through the primary winding of the transformer, the FET and a current sensing resistor. Current increases until the over-current protection circuit in the controller IC is triggered, whereupon the IC controller turns off its FET power transistor. Energy is transferred to the secondary windings of the transformer, where the induced AC current is rectified and charges filter capacitors. After a starting interval of several cycles, the output voltage reaches its regulated level. A threshold comparison circuit provided by the IC controller is coupled to a feedback winding of the transformer and controls the timing of switching by the control IC to maintain the regulated output voltage level. Oscillation stabilizes at a frequency and duty cycle that accommodate the loads coupled to the secondary windings. Many other power supply controllers operate in a similar fashion and may be used instead of the Sanyo STK730 series.

Such an IC controller will attempt to start whenever the raw $B^+$ voltage is present. Other switched circuits control switching between the standby mode and the run mode.

The FET power transistor in an IC controller such as the STK-730 series can be coupled in part to the voltage or current signals generated on the primary winding by operation of the switching circuit, which advantageously causes the switching transistor to be driven harder as current is built up in the primary winding. The switching transistor needs a positive voltage on its gate drive input in order to begin conducting, and may not conduct dependably or may be switched off if the control voltage is too low. One way for preventing operation of the switching transistor is to provide a means to reduce the voltage at the control input. This may appear to be a possible way to switch between the on/off or run/standby modes of the power supply. However, the raw $B^+$ voltage is present whether in the run mode or the standby mode (provided the auxiliary power supply is coupled to the domestic mains), and the raw $B^+$ voltage is the only voltage present during standby.

SUMMARY OF THE INVENTION

It would be advantageous to control switching between the standby mode and run modes of the auxiliary power supply using this raw $B^+$ voltage. It would also be advantageous to control switching between the standby and run modes of the auxiliary power supply in a manner which enables the auxiliary power supply to be controlled only by the current limiting circuits of the power supply IC controller during startup, so as to avoid interference from any fault detection circuit that might be present and prevent completion of the startup phase of the auxiliary power supply.

In accordance with an inventive arrangement, a switched mode power supply circuit controls operation of a power supply controller IC by providing a voltage to the control input of the controller IC from the raw $B^+$ input voltage, to bias a switching transistor coupled to disable the controller IC by pulling down the voltage at its input. When a run mode voltage is detected and triggers operation of the power supply by changing the state of the switching transistor, the power supply operates subject to the current limiting circuits of the controller IC during a startup phase of operation.

The switch control is such that it can be made responsive to a fault condition detector, such as a low voltage and/or overcurrent detector, each of which conditions can be indicative of a fault condition, such as a short circuit. However, the low voltage levels generated during startup can be false indication of a fault condition. Accordingly, the switch control is also such that a delay circuit can be interposed between the fault condition detector and the switch control. The fault condition detector is prevented from disabling the auxiliary power supply for a period of time after the auxiliary power supply has been turned on, to provide an opportunity for the auxiliary power supply to establish an operating output voltage without a false indication of a fault condition.

An auxiliary power supply in an apparatus having run and standby modes of operation, in accordance with an inventive arrangement, comprises: a voltage source, a transformer and a switching controller coupled for switched mode generation of an output supply voltage; a feedback circuit for initiating conduction of said switching controller; and, a switching circuit for changing said auxiliary power supply between operational and non operational modes of operation responsive to an on/off signal indicative of the run and standby modes of operation of the apparatus, said switching circuit being energized by said voltage source and inhibiting said feedback circuit in a manner which inhibits operation of said switching controller during the standby mode of operation of the apparatus.

In a presently preferred embodiment, the voltage source is an unregulated rectified mains voltage source and the on/off signal is a run mode supply voltage generated by another power supply in the apparatus energized by an unregulated rectified mains voltage source. The feedback circuit generates a feedback signal and the switching circuit shunts said feedback signal to a source of reference voltage.

An auxiliary power supply in an apparatus having run and standby modes of operation, in accordance with another inventive arrangement, comprises: a transformer having a primary winding coupled to a voltage source and at least one secondary winding; a switching controller coupled to said primary winding and operable to enable current conduction through said primary winding, power being coupled to said at least one secondary winding by periodic conduction of said switching controller; a feedback control coupled to said at least one secondary winding and said switching controller, said feedback control producing a feedback signal enabling said periodic conduction of said switching controller; and, a switching circuit for changing between operational and non operational modes of said auxiliary power supply responsive to an on/off signal indicative of the run and standby modes of operation of the apparatus, said switching circuit inhibiting said feedback control in a manner which inhibits operation of said switching controller during the standby mode of operation of the apparatus.

In a presently preferred embodiment, the switching control circuit comprises: a voltage divider coupled to said voltage source; a first transistor energized by said voltage divider and coupled to said switching controller to interrupt said feedback control by shunting said feedback signal; a voltage threshold detector responsive to a run mode supply voltage generated by another power supply in said apparatus; and, a second transistor optically coupled to said voltage threshold detector for controlling conduction of said first transistor. The voltage source is unregulated DC voltage rectified from a mains AC supply.

A power supply arrangement for an apparatus having run and standby modes of operation, in accordance with yet another inventive arrangement, comprises: a main power supply energized by a rectified mains voltage source, operating in a switched mode, and generating at least one run mode supply voltage; an auxiliary power supply energized by said rectified mains voltage source and operating in a switched mode, and generating at least one run mode supply voltage responsive to a feedback signal; and, a control circuit for changing said auxiliary power supply between operational and non operational modes of operation responsive to an on/off signal indicative of the run and standby modes of operation of the apparatus, said switching circuit inhibiting said feedback signal in a manner which inhibits operation of said auxiliary power supply during the standby mode of operation of the apparatus.

In a presently preferred embodiment, the control circuit comprises: a voltage divider coupled to said rectified mains voltage source; a first transistor energized by said voltage divider and coupled for shunting said feedback signal; a voltage threshold detector responsive to said at least one run mode supply voltage; and, a second transistor optically coupled to said voltage threshold detector for controlling conduction of said first transistor.

DETAILED DESCRIPTION OF THE PREFERRED EMBODIMENTS

Figure 1:
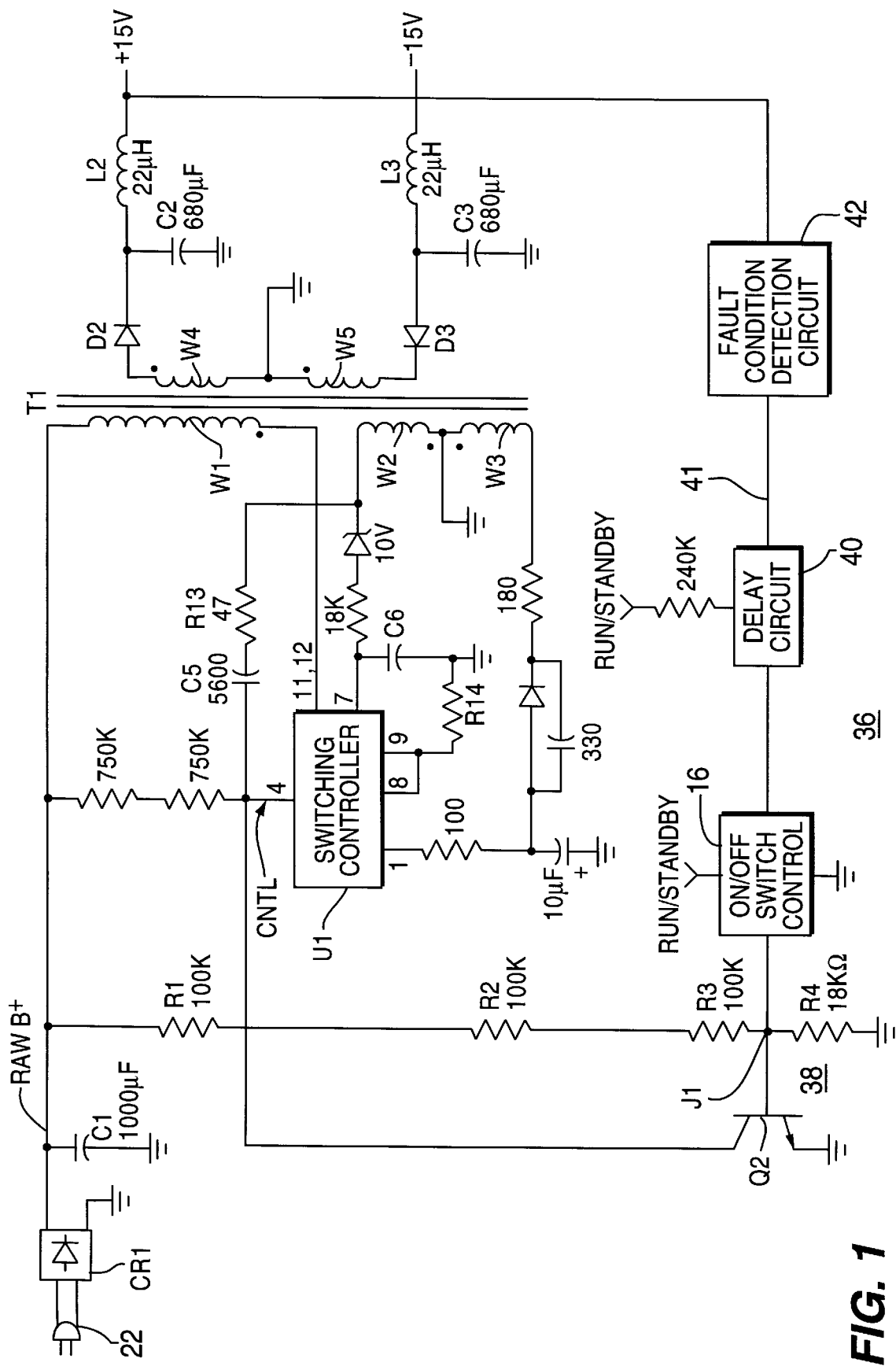
FIG. 1 is a block diagram of an auxiliary power supply having control circuitry in accordance with inventive arrangements.

FIG. 1 generally shows an inventive switched mode power supply having a switching controller U1 operable periodically to apply current from a voltage input, for example a raw $B^+$ voltage, to a primary winding W1 of a transformer T1 for variably coupling power to one or more secondary windings W2, W3, W4 and W5 of transformer T1. The switching controller U1 can comprise, for example, a Sanyo STK730 series controller. Switching controller U1 conducts when a driving voltage, for example the raw $B^+$ voltage, is available on its control input CNTL at pin 4.

The raw $B^+$ input supply voltage is a direct current voltage obtained from the output of a bridge rectifier CR1 filtered by a capacitor C1. The raw $B^+$ voltage is present whenever the power supply 10 is coupled to the domestic mains 22 (i.e., plugged in). However, the power supply 10 only operates in a run mode, and is disabled in a quiescent or standby mode.

When power supply 10 is plugged in and is also in the run mode, the raw $B^+$ voltage is present at the control input (CNTL of switching controller U1, thus enabling switching controller U1 to conduct a current through the primary winding W1 of transformer T1. The current flow through winding W1 induces a voltage across winding W2 of transformer T1, which voltage is applied to the control input CNTL through resistor R13 and capacitor C5. The polarity of winding W2 is such that the voltage induced across winding W2 keeps switching controller U1 conducting.

Switching controller U1 ceases conducting current through primary winding W1, or turns off, when the current conducted by switching controller U1 reaches a current limit threshold that is set by the combination of resistor R14 and capacitor C6. When switching controller U1 ceases conducting, the magnetic field of primary winding W1 collapses, its polarity reverses and the energy contained in primary winding W1 is transferred to windings W4 and W5, which supply power to the +15 V and −15 V, respectively, outputs.

As the energy from windings W4 and W5 becomes exhausted, their magnetic fields collapse and their polarities reverse. In accordance with the polarities of windings W2, W4 and W5, winding W2 provides a positive voltage to pin 4 of switching controller U1, thereby enabling switching controller U1 to once again conduct current through primary winding W1 until the current limit threshold of switching controller U1 has been reached and switching controller U1 ceases conducting current. Energy is then again transferred from primary winding W1 to windings W4 and W5. This process repeats for several cycles, until the operation of power supply 10 has stabilized.

Feedback winding W3 controls the duty cycle of switching controller U1 after the operation of power supply 10 has stabilized. The voltage developed across feedback winding W3 is compared with an internal reference, equal to approximately −40.5 V, developed by switching controller U1. The duty cycle of switching controller U1 is modulated such that the voltage developed across feedback winding W3 is maintained approximately equal to −40.5 V. Feedback winding W3 is coupled to the secondary windings W4 and W5 so that load changes are reflected in the voltage developed across feedback winding W3. Thus, feedback winding W3 is also used to regulate the output voltages developed by windings W4 and W5.

Normally, switching from the standby mode to the run mode or vice versa is accomplished under user control via control inputs (not shown) such as an infrared receiver, panel switches or the like. According to an inventive aspect, additional run/standby switching circuits 36 are provided to shift the power supply 10 between the operational run mode and the non-operational standby mode. Switching controller U1 requires a large start-up current. For dependable starting and assistance in developing this drive current, the run/standby switching circuits 36 include a first circuit 38 coupled between the raw B+ voltage input and the control input CNTL, for providing a voltage bias to enable conduction by the switching controller whenever the raw B+ voltage input is present.

In accordance with an inventive arrangement, the drive current bias provided from first circuit 38 can be shunted away to reduce the available drive current to disable the switching controller U1. The drive current can be shunted to a source of reference potential, for example ground.

The run/standby switching circuits 36 further comprise a fault condition detection circuit 42 coupled to at least one of the transformer secondary windings W4 and W5. The circuit 42 senses a fault condition, such as current overloading on the auxiliary power supply, for example by sensing a low voltage threshold on the output coupled to the same or another secondary winding W4 or W5. The circuit 42 generates an output 41 indicative of a fault condition to disable conduction of switching controller U1 by pulling control input CNTL of switching controller U1 to a ground potential, as a means for switching the auxiliary power supply off, as though the apparatus had been changed to the standby mode of operation. In order to make certain that the startup phase of the auxiliary power supply is not prevented by a false detection of a fault condition, due to initial low voltage output levels, a delay circuit 40 inhibits the effect of the output of the fault condition detection circuit 42 for a sufficient period of time for the nominal output voltage levels of the auxiliary power supply to be established.

Figure 2:
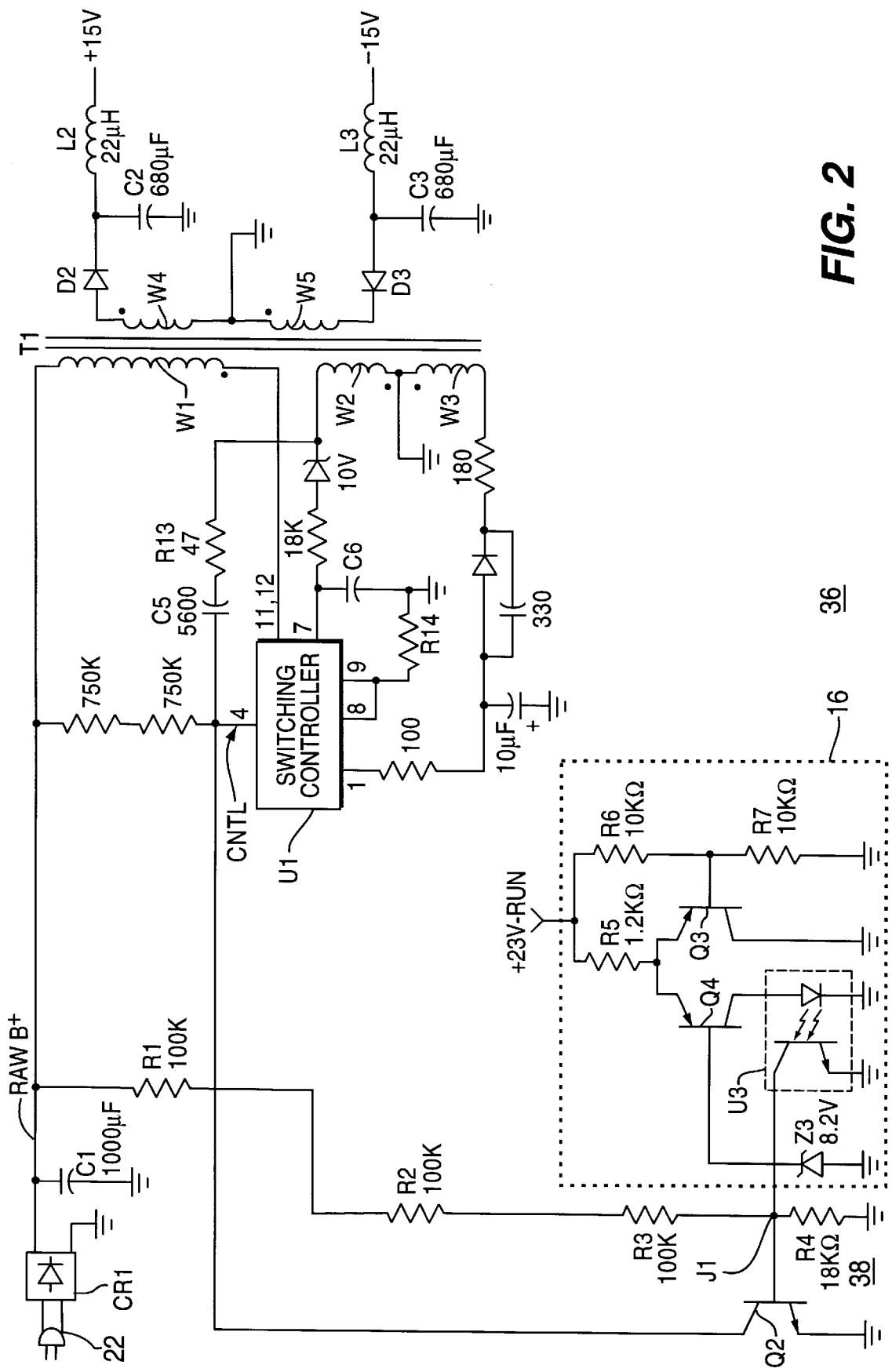
FIG. 2 is a schematic diagram of the auxiliary power supply having control circuitry in accordance with inventive arrangements and illustrating on/off control in more detail.

FIGS. 2–5 illustrate in detail different aspect of the inventive arrangements shown generally in FIG. 1. The same reference numbers are used throughout the drawings to refer to the same or comparable elements. Referring to FIG. 2, switching controller U1 is coupled in series with primary winding W1 of transformer T1. Switching controller U1 alternately conducts and turns off, for transferring power to the secondary windings W4 and W5, where the resulting AC signal is rectified by diodes D2 and D3 and filtered by capacitors C2 and C3, respectively. The filtered voltages provided on windings W4 and W5 are further filtered by chokes L2 and L3, respectively, to provide operational supply voltages +15 V and −15 V, respectively, for powering loads in the run mode.

The polarities of secondary windings W4 and W5 are opposite that of the primary winding W1, as shown in FIG. 2, such that capacitors C2 and C3 are charged when switching controller U1 turns off and the energy stored in the primary winding W1 of transformer T1 is transferred to windings W4 and W5.

According to an inventive aspect, the power supply 10 as shown is arranged to further control the voltage at control input CNTL of switching controller U1 for controlling shifts between run and standby modes. When the device is in standby mode and switching controller U1 is not conducting periodically, the only power going into the power supply 10 is the raw B+ voltage, which is present because the device is coupled to domestic mains 22. It would be possible in controlling run/standby operation to couple and decouple the raw B+ voltage to the switching elements of the power supply 10 using a relay or other switching device powered from a supplemental low power supply (not shown). However, according to the invention a more cost effective solution is obtained by using a signal derived in part from the raw B+ voltage and in part from the run mode voltages, to reduce the bias on control input CNTL to switching controller U1, namely to bring the voltage on the control input to near ground to hold switching controller U1 off until normal bias is restored.

Thus, a voltage divider comprising resistors R1, R2, R3 and R4 is coupled between the raw B+ voltage and ground, and the junction J1 of the voltage divider is coupled to the base of a switching transistor Q2, having its collector coupled to the control input and its emitter grounded. When the raw B+ voltage is present, control input CNTL is pulled to near ground by conduction of transistor Q2. When the power supply 10 is first coupled to the mains, it is held in standby mode.

The invention is advantageously applied to an auxiliary power supply such as the auxiliary supply of a television for powering run mode loads such as convergence amplifiers. For switching into the run mode, the inventive power supply senses the presence of a run mode supply voltage developed from a source other than the secondary windings of transformer T1. This run mode supply voltage is compared to a threshold level, and when the threshold level is passed, transistor Q2 is turned off, permitting the bias on control input CNTL of switching controller U1 to return to normal and permit operation of the auxiliary power supply in the run mode, namely under feedback control by feedback winding W3 of transformer Ti. For example, the +23 V supply that is developed by the run mode operation of the deflection and other circuits in a television can be used for this purpose.

Referring to FIG. 2, a differential pair of PNP transistors Q3 and Q4 have their emitters coupled to the run mode supply voltage by resistor R5, and differentially compare the level of the run mode supply voltage, via the voltage divider of resistors R6 and R7 on the base of transistor Q3, with a reference voltage of +8.2 V provided by Zener diode Z3 on the base of transistor Q4. When the run mode supply exceeds a level determined by the ratio of resistances in the voltage divider, transistor Q4 conducts and switches on optocoupler U3. The phototransistor of optocoupler U3 grounds the base of transistor Q2, which ceases conducting, thereby permitting normal bias on control input CNTL of switching controller U1. Operation of the power supply 10 then commences in the run mode responsive to the voltages on the secondary windings W2 and W3 of transformer T1.

Figure 3:
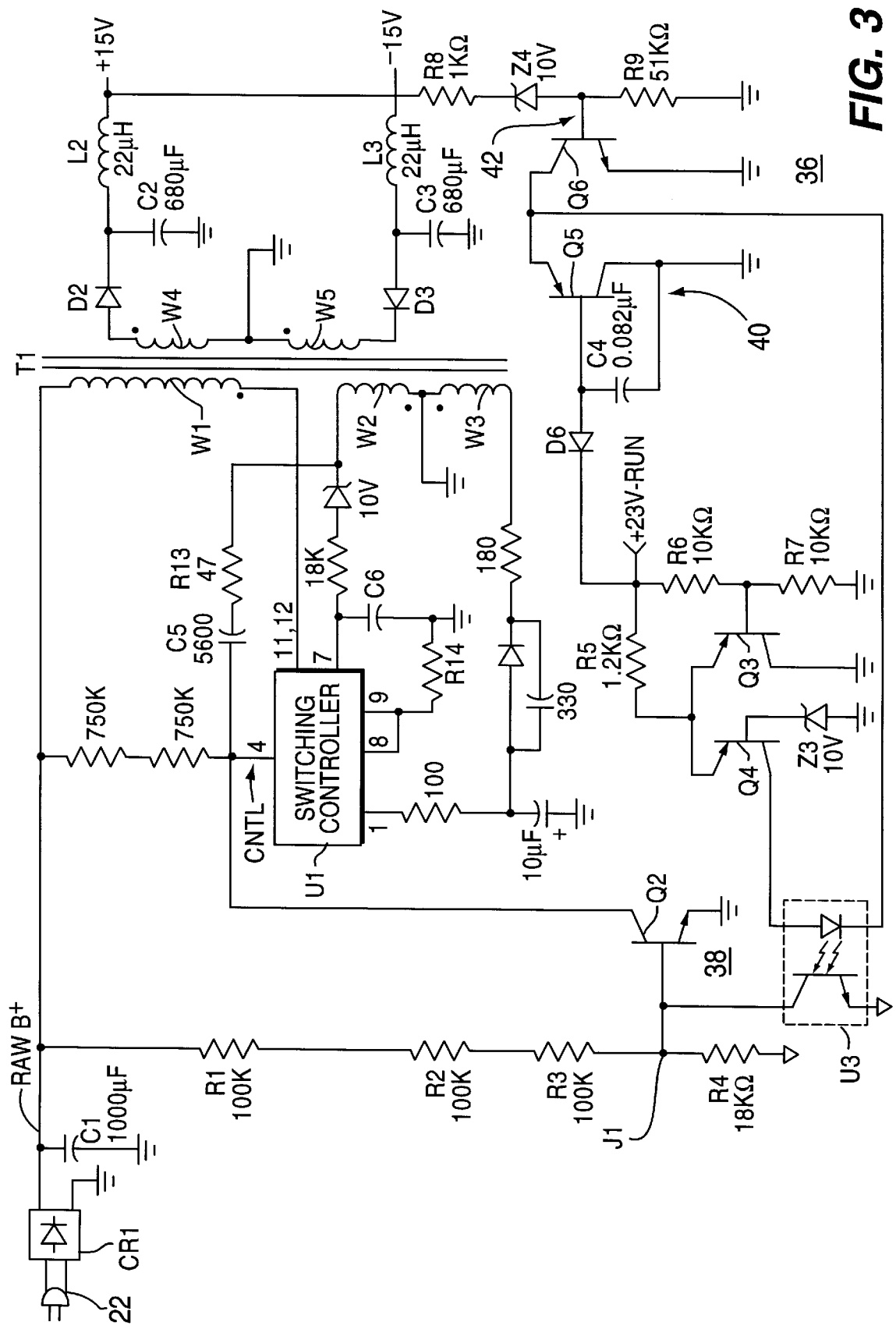
FIG. 3 is a schematic diagram of an auxiliary power supply having control circuitry in accordance with inventive arrangements and illustrating start up and fault detection circuitry in more detail.

Another inventive embodiment is shown in FIG. 3, and includes a latching circuit that has the additional function of detecting current overload conditions, when in the run mode, for switching the power supply 10 into the standby mode. Current overloading causes the output voltage level to drop below nominal, because in overcurrent conditions the overcurrent protection circuits of switching controller U1 turn switching controller U1 off before sufficient power has been coupled through the power supply 10 to maintain the nominal output voltage level. This method of current limiting is less than optimal for powering loads such as the digital convergence amplifiers of a projection television. For such loads, it is advantageous if the power supply 10 can be turned off when an overcurrent condition occurs, instead of attempting to supply current to the loads at reduced voltage. According to the invention, this function is achieved in a manner that interfaces with the circuits controlling switching between the run and standby modes as in FIG. 2.

In FIG. 3, control for switching from standby to run mode is provided in part by the run mode supply voltage, such as the +23 V run supply, passing a predetermined voltage as determined by the differential transistor pair Q3 and Q4, which provide current to the LED of optocoupler U3. The phototransistor of optocoupler U3 then turns off transistor Q2 and permits operation of switching controller U1. Resistors R1, R2, R3 and R4 provide bias to transistor Q2 at junction J1 from the raw B+ supply voltage. In comparison to the embodiment of FIG. 2, in which the cathode of the LED in optocoupler U3 is grounded, according to FIG. 3, the current through the LED charges a capacitor C4, through the base of a PNP transistor Q5.

Capacitor C4 provides for a delay upon first switching from the standby mode into the run mode, in which the power supply 10 can start up. When the supply 10 is running and the regulated voltage, in this case nominally +15 V, exceeds approximately +10V, Zener diode Z4 conducts through resistors R8 and R9, and turns on transistor Q6. The current from optocoupler U3 is then shunted to ground through transistor Q6 and capacitor C4 stops charging. Transistor Q5 is then off and capacitor C4 cannot discharge through either transistor Q5 or through diode D6, which is coupled to the +23 V run mode supply and is reverse biased.

In the event that the +15 V output voltage falls below the level needed to cause Zener diode Z4 to conduct, especially in the case of a current overload on secondary winding W4, transistor Q6 turns off due to insufficient base drive. With transistor Q6 off, capacitor C4 can charge from the current through optocoupler U3. When the charge on capacitor C4 reaches approximately +10 V, transistor Q5 turns off, and there is no path for the current through optocoupler U3. In that case, although differential transistors Q3 and Q4 still detect the presence of the +23 V run supply, no current is conducted by the phototransistor of optocoupler U3. The raw B+ supply turns on transistor Q2 due to the voltage divider formed at junction J1 by resistors R1, R2, R3 and R4. The control input CNTL of switching controller U1 is pulled low. The power supply 10 shuts off, protecting the loads coupled to the outputs. Thus, unlike a power limiting solution wherein the current limiting circuits of the switching controller reduce the output voltage below nominal but continue to supply power, the inventive circuit as described switches off the power supply 10 in overcurrent conditions. This is accomplished using the run/standby circuits driven from the raw B+ power supply, providing a current overload protective function with a minimum of parts and complexity.

As illustrated in FIGS. 1 and 3, fault condition detection circuit 42 is utilized to detect current overload conditions on the +15 V output of power supply 10. Detection of overload conditions on the −15 V output is complicated by the fact that exclusively positive-polarity biasing voltages, for example raw B+, are used in power supply 10.

Figure 4:
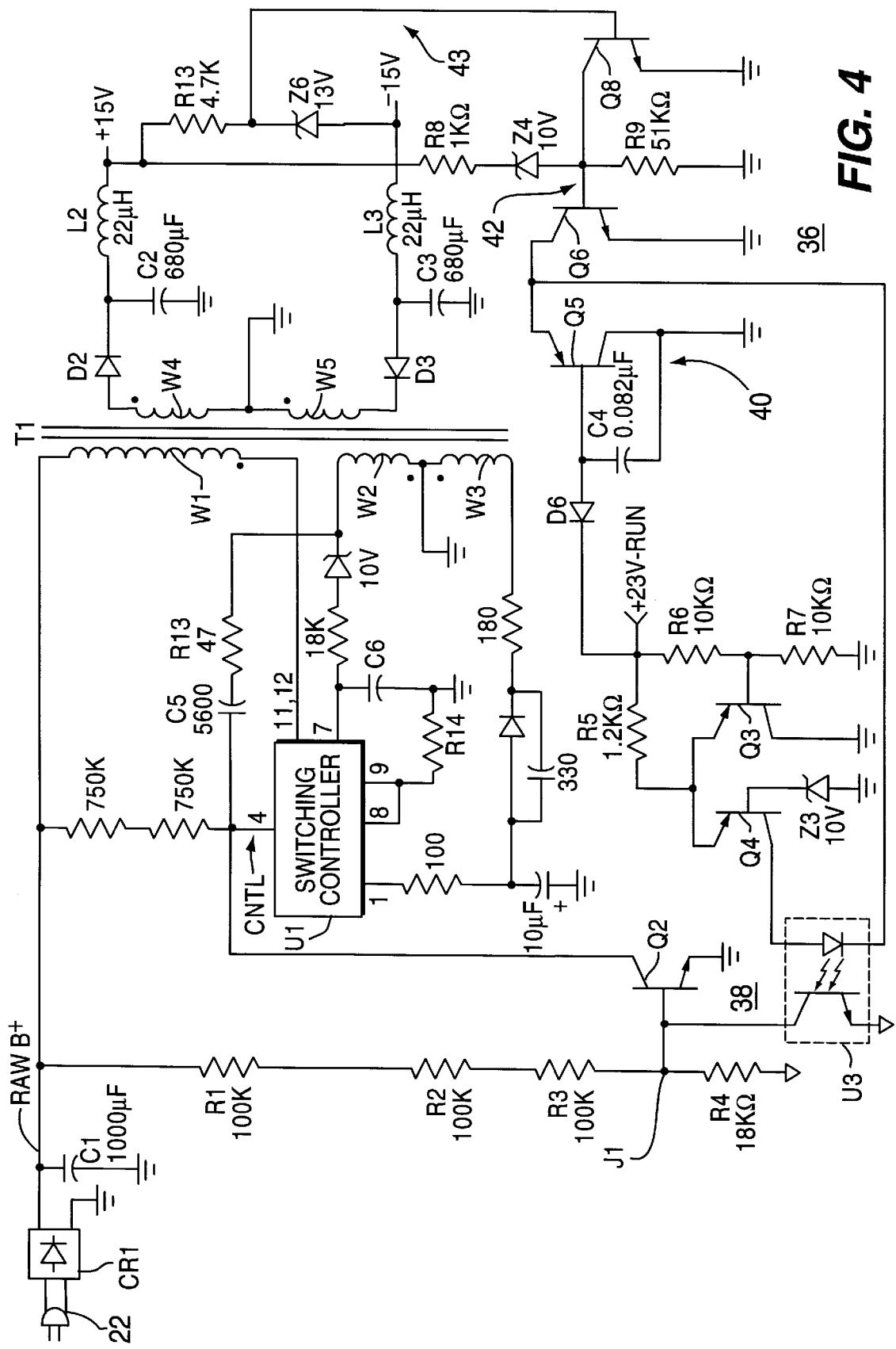
FIG. 4 is a schematic diagram of an auxiliary power supply having a current overload detection circuit in accordance with inventive arrangements.

An additional inventive arrangement, shown in FIG. 4 advantageously and elegantly provides for detection of current overload conditions on the −15 V output in the absence of negative-polarity bias voltages. Detection of a current overload condition on the −15 V output, when in the run mode, causes the power supply 10 to be switched into the standby mode. In FIG. 4, the negative supply voltage overload detection circuit 43 is coupled between the +15 V and −15 V outputs of power supply 10. The Zener diode Z6 is biased between the +15 V and −15 V outputs of the power supply 10, such that the base of transistor Q8 has a bias voltage that is equal to approximately −2 V when the −15 V output is nominally loaded. The Zener diode Z6 thus provides a level-shifting mechanism, or a dc offset, that enables the −15 V output to be compared against a positive reference voltage, which in this embodiment is the turn-on voltage of the base-emitter junction of transistor Q8, for detecting a current overload condition.

If, in response to a current overload condition, the −15 V output begins to drop toward a ground potential, the voltage at the base of transistor Q8 will also tend to move toward ground. Eventually, if the current overload condition persists and the −15 V output consequently reaches a predetermined threshold voltage level, the voltage at the base of transistor Q8 will become positive and will eventually become high enough, for example approximately 0.7 V, to turn on transistor Q8 to signal a current overload condition. Unlike fault condition detection circuit 42, where a current overload condition is signaled by a change in the conductive state of Zener diode Z4, Zener diode Z6 remains in a conductive state when a current overload condition is signaled by transistor Q8. The desired threshold level can be selected by an appropriate choice of the breakdown voltage of Zener diode Z6.

When transistor Q8 turns on, current is drawn from the base of transistor Q6, thereby turning transistor Q6 off. Thus, similarly to the detection of an overcurrent condition on the +15 V output, with transistor Q6 off, capacitor C4 can charge from the current through optocoupler U3. When the charge on capacitor C4 reaches approximately +10 V, transistor Q5 turns off, and there is no path for the current through optocoupler U3. In that case, although differential transistors Q3 and Q4 still detect the presence of the +23 V run supply, no current is conducted by the phototransistor of optocoupler U3. The raw B+ supply turns on transistor Q2 due to the voltage divider formed at junction J1 by resistors R1, R2, R3 and R4. The control input CNTL of switching controller U1 is pulled low. The power supply 10 shuts off, protecting the loads coupled to the outputs.

When the +23 V run supply voltage drops, capacitor C4 is discharged through diode D6, which otherwise would be reverse biased by the presence of the +23 V run supply. Once capacitor C4 has discharged, the power supply 10 can be restarted unless there is still an overload condition on the output that prevents development of a sufficient output voltage to turn on transistor Q6 during the delay time in which the charge on capacitor C4 can rise to a sufficient voltage to turn off transistor Q5.

If capacitor C4 is not allowed enough time to fully discharge, for example if switched mode power supply 10 is shifted from the run mode to the standby mode and then back to the run mode in rapid succession, transistor Q5 will remain off. The run mode output voltages will thus be prevented from coming up and attaining their nominal output voltage levels.

Figure 5:
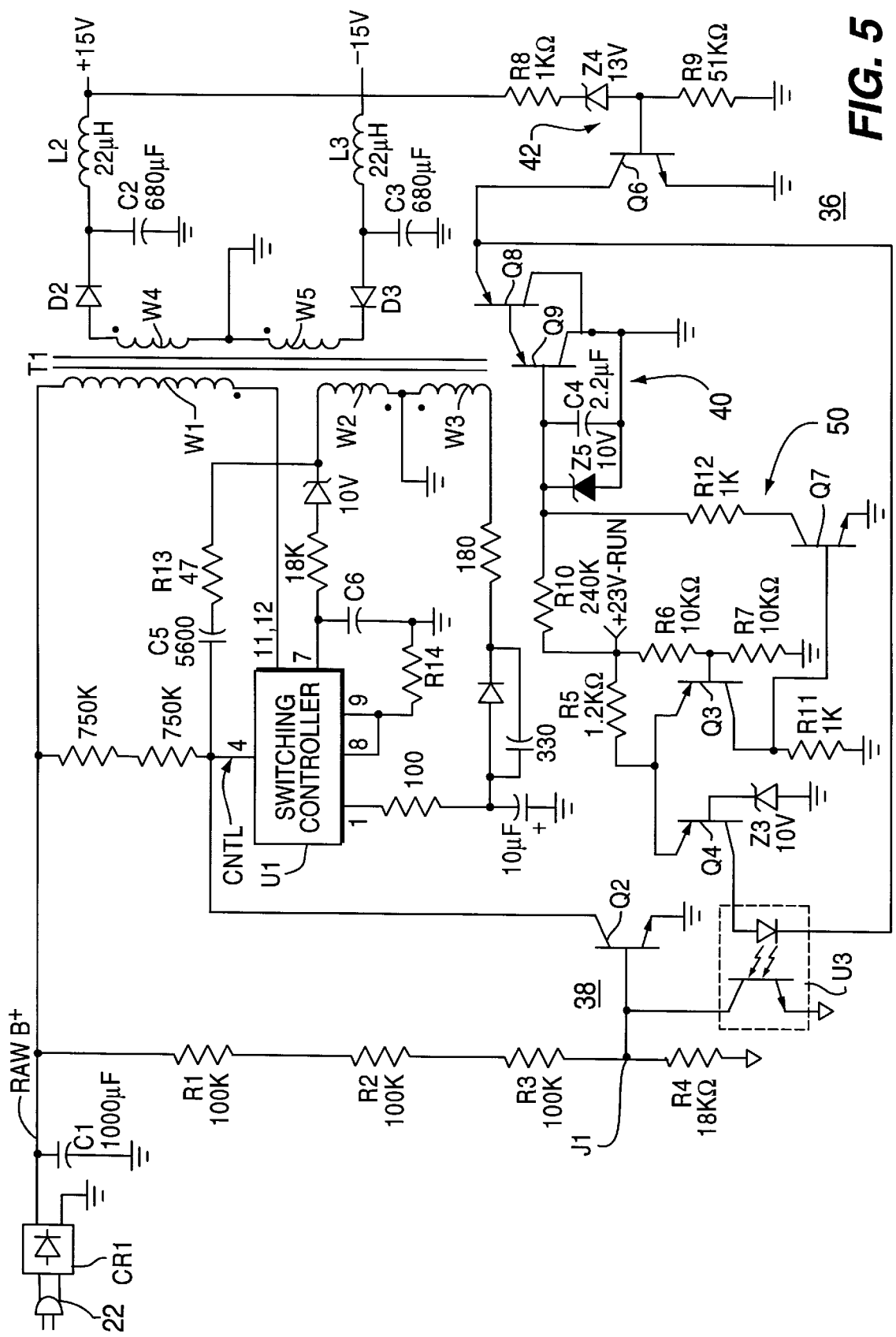
FIG. 5 is a schematic diagram of an auxiliary power supply having a quick-reset circuit in accordance with inventive arrangements.

A further inventive embodiment shown in FIG. 5 provides a quick-reset circuit 50 for rapidly discharging capacitor C4 when the +23 V run supply voltage drops. According to the invention, this function is achieved in a manner that interfaces with the circuits controlling switching between the run and standby modes as in FIG. 2.

In FIG. 5, the delay circuit 40 has a Zener diode Z5 in parallel with capacitor C4. When the +23 V run supply voltage comes up, capacitor C4 charges through resistor R10 to provide the delay time for the run mode output voltages to stabilize at approximately their nominal output voltage levels. Zener diode Z5 clamps the voltage across capacitor C4 to approximately +10 V to prevent damage to the base-emitter junctions of transistors Q8 and Q9, which are arranged in a Darlington configuration.

Once power supply 10 is in the run mode, transistor Q4 and the diode of optocoupler U3 conduct current, in a manner similar to the embodiment shown in FIG. 3. Unlike the embodiment in FIG. 3, however, this current is not used to charge capacitor C4. The arrangement of transistors Q8 and Q9 in a Darlington configuration results in only a minimal current flow in the base of transistor Q9. Thus, the charging rate of capacitor C4, and the delay time caused thereby, is determined exclusively by the time constant formed by resistor R10 and capacitor C4. This advantageously eliminates any variation in the charging rate of capacitor C4 due to the current amplification factor, or beta, of transistor Q5 in FIG. 3 or the Darlington arrangement of transistors Q8 and Q9 in FIG. 5.

Referring to FIG. 5, when power supply 10 is shifted into the standby mode, the +23 V run supply voltage starts to drop. As the run supply voltage drops below a level determined by the ratio of resistances in the voltage divider of resistances R6 and R7, current flow is redirected from transistor Q4 to transistor Q3. The current flowing through transistor Q3 establishes a voltage across resistor R11, which voltage biases reset transistor Q7 on. Capacitor C4 is thereby rapidly discharged to ground through resistor R12 and reset transistor Q7 before the +23 V run voltage has completely decayed.

It will be apparent to those skilled in the art that, although the invention has been described in terms of specific examples, modifications and changes may be made to the disclosed embodiments without departing from the essence of the invention. Accordingly, reference should be made to the appended claims, rather than to the foregoing specification, as indicating the true scope of the invention.

What is claimed is:

1. An auxiliary power supply in an apparatus having run and standby modes of operation, comprising:

a voltage source, a transformer and a switching controller coupled for switched mode generation of an output supply voltage;

a feedback circuit for initiating conduction of said switching controller; and, a switching circuit for changing said auxiliary power supply between operational and non operational modes of operation responsive to an on/off signal indicative of the run and standby modes of operation of the apparatus, said switching circuit being energized by said voltage source and inhibiting said feedback circuit in a manner which inhibits operation of said switching controller during the standby mode of operation of the apparatus.

2. The auxiliary power supply of claim 1, wherein said on/off signal is a run mode supply voltage generated by another power supply in said apparatus.

3. The auxiliary power supply of claim 1, wherein said voltage source is an unregulated rectified mains voltage source.

4. The auxiliary power supply of claim 1, wherein said voltage source is an unregulated rectified mains voltage source and said on/off signal is a run mode supply voltage generated by another power supply in said apparatus energized by an unregulated rectified mains voltage source.

5. The auxiliary power supply of claim 1, wherein said feedback circuit generates a feedback signal and said switching circuit shunts said feedback signal to a source of reference voltage.

6. An auxiliary power supply in an apparatus having run and standby modes of operation, comprising:

a transformer having a primary winding coupled to a voltage source and at least one secondary winding;

a switching controller coupled to said primary winding and operable to enable current conduction through said primary winding, power being coupled to said at least one secondary winding by periodic conduction of said switching controller;

a feedback control coupled to said at least one secondary winding and said switching controller, said feedback control producing a feedback signal enabling said periodic conduction of said switching controller; and, a switching circuit for changing between operational and non operational modes of said auxiliary power supply responsive to an on/off signal indicative of the run and standby modes of operation of the apparatus, said switching circuit inhibiting said feedback control in a manner which inhibits operation of said switching controller during the standby mode of operation of the apparatus.

7. The auxiliary power supply of claim 6, wherein said switching circuit is responsive to a run mode supply voltage generated by another power supply in said apparatus.

8. The auxiliary power supply of claim 6, wherein said switching circuit is coupled to said voltage source.

9. The auxiliary power supply of claim 6, wherein said switching circuit is coupled to said voltage source and responsive to a run mode supply voltage generated by another power supply in said apparatus.

10. The auxiliary power supply of claim 6, wherein said switching circuit is coupled to said voltage source, is responsive to a run mode supply voltage generated by another power supply in said apparatus and interrupts propagation of said feedback signal.

11. The auxiliary power supply of claim 6, wherein said switching circuit is responsive to a run mode supply voltage generated by another power supply in said apparatus.

12. The auxiliary power supply of claim 6, wherein said switching control circuit comprises:

a voltage divider coupled to said voltage source;

a first transistor energized by said voltage divider and coupled to said switching controller to interrupt said feedback control by shunting said feedback signal; and, a second transistor responsive to said on/off signal for controlling conduction of said first transistor.

13. The auxiliary power supply of claim 6, wherein said switching control circuit comprises:

a voltage divider coupled to said voltage source;

a first transistor energized by said voltage divider and coupled to said switching controller to interrupt said feedback control by shunting said feedback signal;

a voltage threshold detector responsive to a run mode supply voltage generated by another power supply in said apparatus; and, a second transistor optically coupled to said voltage threshold detector for controlling conduction of said first transistor.

14. The auxiliary power supply of claim 6, wherein said voltage source is unregulated DC voltage rectified from a mains AC supply.

15. The auxiliary power supply of claim 14, wherein said switching circuit is coupled to said voltage source.

16. The auxiliary power supply of claim 14, wherein said switching circuit is coupled to said voltage source and responsive to a run mode supply voltage generated by another power supply in said apparatus.

17. The auxiliary power supply of claim 14, wherein said switching circuit is coupled to said voltage source, is responsive to a run mode supply voltage generated by another power supply in said apparatus and interrupts propagation of said feedback signal.

18. The auxiliary power supply of claim 14, wherein said switching control circuit comprises:

a voltage divider coupled to said voltage source;

a first transistor energized by said voltage divider and coupled to said switching controller to interrupt said feedback control by shunting said feedback signal; and, a second transistor responsive to said on/off signal for controlling conduction of said first transistor.

19. The auxiliary power supply of claim 14, wherein said switching control circuit comprises:

a voltage divider coupled to said voltage source;

a first transistor energized by said voltage divider and coupled to said switching controller to interrupt said feedback control by shunting said feedback signal;

a voltage threshold detector responsive to a run mode supply voltage generated by another power supply in said apparatus; and, a second transistor optically coupled to said voltage threshold detector for controlling conduction of said first transistor.

20. A power supply arrangement for an apparatus having run and standby modes of operation, comprising:

a main power supply energized by a rectified mains voltage source, operating in a switched mode, and generating at least one run mode supply voltage;

an auxiliary power supply energized by said rectified mains voltage source and operating in a switched mode, and generating at least one run mode supply voltage responsive to a feedback signal; and, a control circuit for changing said auxiliary power supply between operational and non operational modes of operation responsive to an on/off signal indicative of the run and standby modes of operation of the apparatus, said switching circuit inhibiting said feedback signal in a manner which inhibits operation of said auxiliary power supply during the standby mode of operation of the apparatus.

21. The power supply arrangement of claim 20, wherein said on/off signal is said at least one run mode supply voltage.

22. The auxiliary power supply of claim 21, wherein said control circuit comprises:

a voltage divider coupled to said rectified mains voltage source;

a first transistor energized by said voltage divider and coupled for shunting said feedback signal;

a voltage threshold detector responsive to said at least one run mode supply voltage; and, a second transistor optically coupled to said voltage threshold detector for controlling conduction of said first transistor.

* * * * *